(12) United States Patent
Burnett et al.

(10) Patent No.: US 7,674,048 B2
(45) Date of Patent: Mar. 9, 2010

(54) POLARITY CHECKING APPARATUS FOR MULTI-FIBER CONNECTORS

(75) Inventors: Julie A. Burnett, Lenoir, NC (US); Mark E. Conner, Granite Falls, NC (US); Eric S. Quinby, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/980,179

(22) Filed: Oct. 30, 2007

(65) Prior Publication Data

US 2009/0109424 A1     Apr. 30, 2009

(51) Int. Cl.
   *G02B 6/36* (2006.01)
(52) U.S. Cl. .................................................. 385/88
(58) Field of Classification Search ............... 385/53, 385/114, 88
   See application file for complete search history.

(56) References Cited

U.S. PATENT DOCUMENTS

| | | | |
|---|---|---|---|
| 4,066,350 A * | 1/1978 | Koide et al. ............... 353/27 R |
| 4,922,186 A * | 5/1990 | Tsuchiya et al. ............... 324/96 |
| 4,982,152 A * | 1/1991 | Takahashi et al. .............. 324/96 |
| 5,434,426 A * | 7/1995 | Furuyama et al. ........... 250/551 |
| 6,250,817 B1 | 6/2001 | Lampert et al. ............... 385/56 |
| 6,409,392 B1 | 6/2002 | Lampert et al. ............... 385/56 |
| 6,634,796 B2 | 10/2003 | de Jong et al. ................ 385/56 |
| 6,758,600 B2 | 7/2004 | Del Grosso et al. ........... 385/71 |
| 6,869,227 B2 | 3/2005 | Del Grosso et al. ........... 385/71 |
| 7,184,635 B2 * | 2/2007 | Livingston ................... 385/114 |
| 7,237,966 B2 | 7/2007 | Quinby et al. ................. 385/78 |
| 7,416,347 B2 * | 8/2008 | Livingston et al. ........... 385/53 |
| 2004/0062498 A1 | 4/2004 | Del Grosso et al. ......... 385/114 |
| 2008/0024789 A1* | 1/2008 | Tobiason et al. ............. 356/521 |

* cited by examiner

*Primary Examiner*—Frank G Font
*Assistant Examiner*—Eric Wong
(74) *Attorney, Agent, or Firm*—Michael E. Carroll, Jr.

(57) ABSTRACT

A polarity checking apparatus for multi-fiber connectors includes a body, a diverging lens attached to the body and a screen attached to the body, wherein the apparatus is configured to determine test and/or determine polarity of the multi-fiber connector. The screen may be translucent or may be opaque in part and rotatable for checking whether a signal is being transmitted on an individual optical fiber position of the multi-fiber connector. The invention is also directed to a method for checking the polarity of an optical assembly.

24 Claims, 3 Drawing Sheets

POLARITY CHECKING APPARATUS FOR MULTI-FIBER CONNECTORS

BACKGROUND OF THE INVENTION

Service providers are building communications networks that push optical fibers closer to subscribers, thereby increasing the bandwidth and reliability for the subscribers. This build-out of the optical network uses fiber optic distribution cables to route optical fibers toward the subscribers. Fiber optic distribution cables have access locations that are selected and accessed along the distribution cable for routing one or more optical fibers away from the distribution cable and toward the subscriber. For instance, some distribution cables are factory-terminated at, or near, the access locations with multi-fiber optic connectors. However, in many cases, distribution cables are field-terminated such as by fusion splicing of factory-terminated assemblies at the desired access location.

Unlike factory-terminated distribution cables, verifying proper polarity of the optical fibers at the field termination of the access location is burdensome and may cause damage to the end face of a ferrule used in the fiber optic connector. Specifically, checking polarity of the field terminated multi-fiber connector requires mating a compatible connector to the field-terminated multi-fiber connector. Attaching a compatible connector for testing/polarity checking risks contamination and damage to the field-terminated access location. Damage or contamination to the field-terminated access locations may result in costly rework or repairs due to labor and/or materials.

Additionally, one viable test method for checking polarity at multi-fiber connector points along an optical fiber distribution cable is by using a Visual Fault Locator (VFL), which is typically a Class II laser. The use of a VFL creates an eye safety concern for the craft. In other words, eye injury can result if the craftsman looks directly into the laser beam, repeatedly, or over a prolonged period of time.

Thus, there is a unresolved need in the industry for devices and methods that allow for checking polarity of multi-fiber connectors/assemblies that minimizes risk of damage to multi-fiber connections in a quick, safe, easy, and reliable manner.

BRIEF SUMMARY OF THE INVENTION

The present invention is directed to devices and methods for quickly, safely, easily, and reliably checking optical fiber position(s) and/or polarity at multi-fiber connector location (s) in a communication networks. By way of example, a duplex system has optical fibers are installed in pairs in patch panels. The duplex system provides a continuous passive pathway between transmitters and receivers on both ends. This transmit and receive configuration requires the optical fibers to be installed in a manner that will allow the system to transmit from one location and receive at another with the correct orientation between optical fibers. Thus, maintaining system polarity is essential for an optical fiber system to work properly. Specifically, system polarity ensures that the correct optical fiber(s) on one end of a link will communicate with the desired optical fiber(s) on the other end. With this in mind, the concepts of the invention may be used with any suitable type of multi-fiber optical connector such as hardened connectors used on fiber to the home (FTTH) distribution cables, less rugged optical assemblies having multi-fiber ferrules, or the like.

One embodiment of the present disclosure is directed to a polarity checking apparatus for multi-fiber connectors having a body with a first portion and a second portion. A diverging lens is attached to the first portion of the body and a screen is attached to the second portion of the body. The first portion of the body is configured to mate with a suitable fiber optic connector having a multi-fiber ferrule to test and/or determine polarity of the same. Specifically, the screen includes one or more targets for checking whether a signal is present on a predetermined optical fiber position of the multi-fiber connector. Although, the first portion of the body is configured to mate with the fiber optic connector or multi-fiber ferrule, it preferably avoids contact with a ferrule end face, thereby inhibiting damage thereto. Additionally, the polarity checking apparatus may include a cap for keeping dust and debris from the diverging lens and the screen may be fixed or adjustable.

Another embodiment of the invention is directed to a polarity checking apparatus for multi-fiber connectors having a diverging lens and a screen that are attached to a body. The body includes a suitable mating portion for removably attaching to a portion of a suitable multi-fiber connector. The mating portion includes a keyed portion for alignment with the multi-fiber connector. The mating portion and/or the keyed portion may optionally include a stop (i.e., an interference portion) so that the polarity checking apparatus avoids contact with a ferrule end face, thereby inhibiting damage thereto.

Another embodiment according to the invention is directed to a polarity checking apparatus having a body with a diverging lens and a screen attached thereto. The screen is adjustable for checking whether a signal is present at specific optical fiber positions of a multi-fiber connector. The screen may be adjusted by rotation or sliding on one or more suitable axes. The screen may further include an opaque portion to block undesired light and/or to focus attention on a lighted optic fiber to determine the polarity of the fiber optic connector. In other configurations, the screen may be slid up and down or side to side to indicate a specific optical fiber position; for instance, the screen is positionable into one of twelve linear optical fiber positions for multi-fiber array connector having 12-fibers. Again, the body may also include a mating portion and/or a keyed portion that is configured for alignment with the multi-fiber connector. The mating portion and/or keyed portion may also be configured to avoid contact with the ferrule end face of the multi-fiber connector.

The present invention is also directed to a method for checking the polarity of an multi-fiber assembly. The method includes the steps of providing a polarity checking apparatus having a screen, attaching the polarity checking apparatus to an assembly having a multi-fiber ferrule such that the polarity checking apparatus does not contact a ferrule end face of the multi-fiber array connector ferrule, and assessing a polarity of the multi-fiber array connector ferrule by checking for a light from a selected optical fiber of the multi-fiber array connector ferrule on the screen. The screen may include a target for checking optical fiber positions of the multi-fiber array connector ferrule. The screen may be adjusted such as by rotation or sliding to check individual optical fiber positions of the multi-fiber array connector ferrule. The screen may also include a translucent portion and an opaque portion to respectively allow light to pass and to block light not being checked.

It is to be understood that both the foregoing general description and the following detailed description present embodiments of the disclosure, and are intended to provide an overview or framework for understanding the nature and character of the disclosure as it is claimed. The accompanying drawings are included to provide a further understanding of the disclosure, and are incorporated into and constitute a part of this specification. The drawings illustrate various embodiments of the disclosure and together with the description serve to explain the principals and operations of the disclosure.

BRIEF DESCRIPTION OF THE DRAWINGS

The foregoing and other features, aspects and advantages of the present disclosure may be better understood when the following detailed description is read with reference to the accompanying drawings, in which.

DETAILED DESCRIPTION OF THE DISCLOSURE

Figure 1:
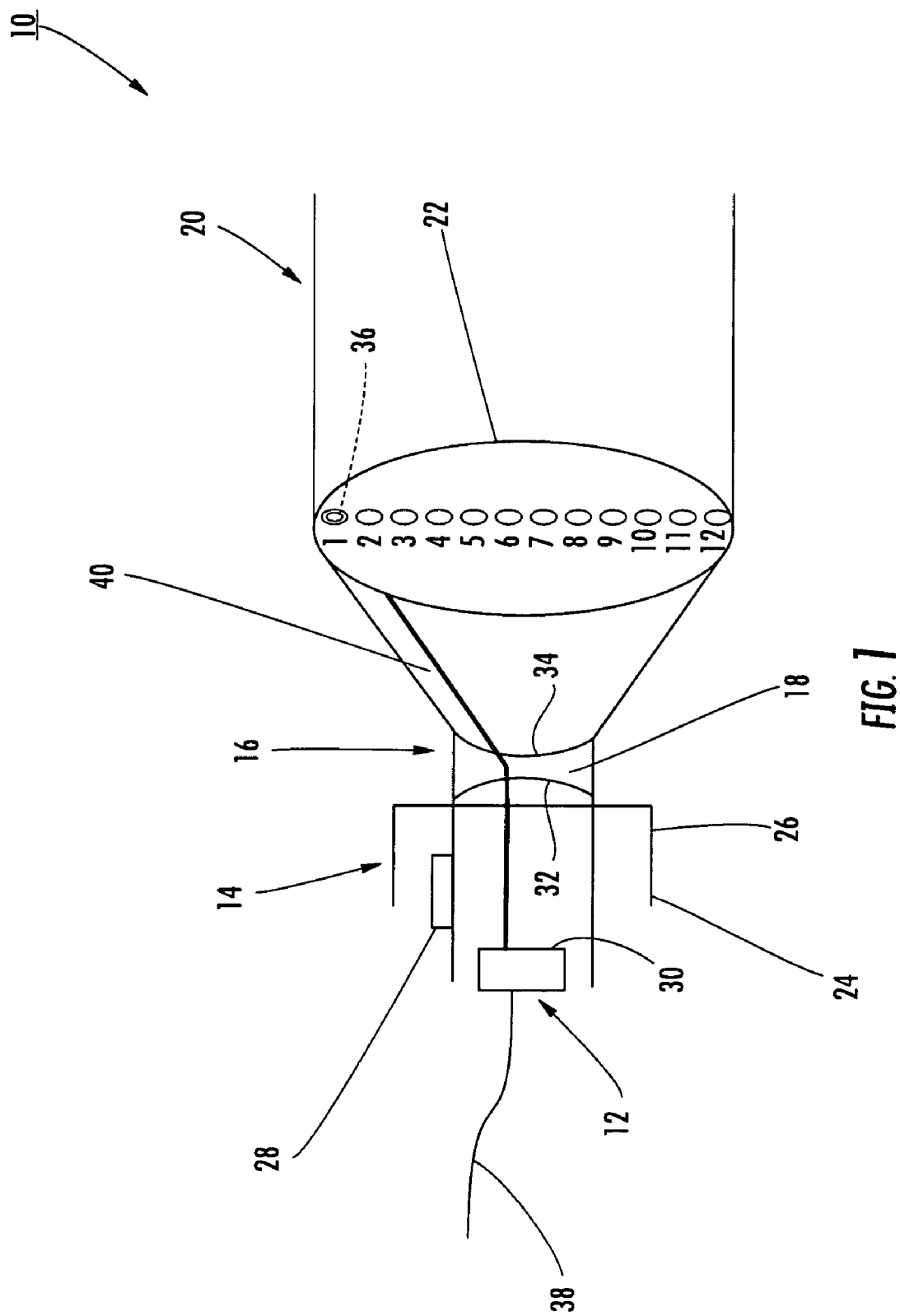
FIG. 1 is a schematic view of a polarity checking apparatus according to one embodiment of the present invention.

The present disclosure will now be described more fully hereinafter with reference to the accompanying drawings in which exemplary embodiments of the disclosure are shown. However, aspects of this disclosure may be embodied in many different forms and should not be construed as limited to the embodiments set forth herein. These exemplary embodiments are provided so that this disclosure will be both thorough and complete, and will fully convey the scope of the disclosure to those skilled in the art. Whenever possible, like reference numerals will be used throughout the detailed description of the disclosure to refer to like or similar elements of the various drawings.

The present disclosure generally provides various embodiments of a polarity checking apparatus for determining whether a signal is carried by an optical fiber of a multi-fiber array connector. The polarity checking apparatus is advantageous because it minimizes risk of damage by eliminating any need to contact an end face of a factory-terminated multi-fiber connector ferrule. Additionally, the apparatus provides a safer method of inspection when working with lasers used in visual fault locators (VFL's) since an installation technician will not need to view the laser beam directly emitted from the connector.

With reference to FIG. 1, a polarity checking apparatus is designated in general by the reference numeral 10. As shown, the polarity checking apparatus 10 is used for determining which optical fiber of a multi-fiber ferrule 12 carries a test signal. The polarity checking apparatus 10 generally includes a body 24 having a first portion 14, a second portion 16, a diverging lens 18 (i.e., negative lens), a shroud 20 that may act as a shade, and a screen 22. By way of brief introduction, in use by the craft the polarity checking apparatus 10 is connected to a connector (not shown) having ferrule 12 for checking whether one or more optical fibers 38 carries a signal. For clarity purposes, only one optical fiber 38 is illustrated as disposed in ferrule 12. In this example, the screen 22 is fixed and translucent and may be manufactured from ground glass, plastic, or other suitable material. The exemplary screen 22 may include twelve co-axial or linearly arranged positions or targets 36 corresponding to respective optical fiber positions 1-12 of the optical fibers 38 within ferrule 12. Thus, a position for each one of the optical fibers 38 corresponding one of the targets 36 is disposed on screen 22 and is fixed relative to diverging lens 18 in this embodiment. Of course, fewer or additional targets 36 may be provided for testing fewer or additional optical fibers 38, and the invention is not limited to the exemplary embodiment shown. This and other embodiments and their equivalents may be better understood from the following discussion and by practice of the concepts of the invention.

The first portion 14 of body 24 may include a cap or cover 26 for inhibiting dust and debris from contaminating diverging lens 18. The cover 26 may be removed from the body 24 to attach the first portion 14 to a portion of the connector (not shown) having ferrule 12, or the cover 26 may have an elastomeric slit or other opening (not visible) that can be urged open to secure the first portion 14 to the connector 12 without having to remove the cover 26. If cover 26 is removable, it may be removably secured by using a threaded portion, snap-fit, or the like. The first portion 14 may also include a keyed portion or key 28 for attaching the coupling body 24 to a respective portion of the connector having ferrule 12. The key 28 is used for aligning the body 24 and the multi-fiber connector to ensure proper alignment and fit therewith. Additionally, the key 28, when fully engaged, may act as a stop (i.e., an interference portion) to ensure that potentially damaging contact with a ferrule end face 30 of the connector ferrule 12 is avoided.

FIG. 1 further shows that the diverging lens 18 includes a first concave side 32 and a second concave side 34 for bending the beam of light 40 transmitted by a visual fault locator (VFL) that passes through optical fiber 38 and exits toward diverging lens 18 during testing. In other words, diverging lens 18 bends the light 40 emitted at the tightly arrayed optical fibers in ferrule 12 to diverge onto the fixed targets 36 of the translucent screen 22 (i.e., the diverging lens bends the light into a wider array spacing at the screen). More specifically, the respective optical fiber position is evident to the technician by appearing on the corresponding target 36 by illuminating the respective position carrying the signal (i.e., which optical fiber 38 is lit) to the craft so polarity can be determined. Thus, the spacing of targets 36 on screen 22 and characteristics of diverging lens 18 should be matched so correct target 36 is illuminated when the appropriate optical fiber carries the test signal. Moreover, the danger of the craft directly viewing the laser beam is greatly reduced. Also shown, the shroud 20 may be utilized during this polarity check to protect the technician's eyes from light emanating, for example, from "behind" the screen 22 (i.e., in an area between the ferrule end face 30 and the screen 22).

Figure 2:
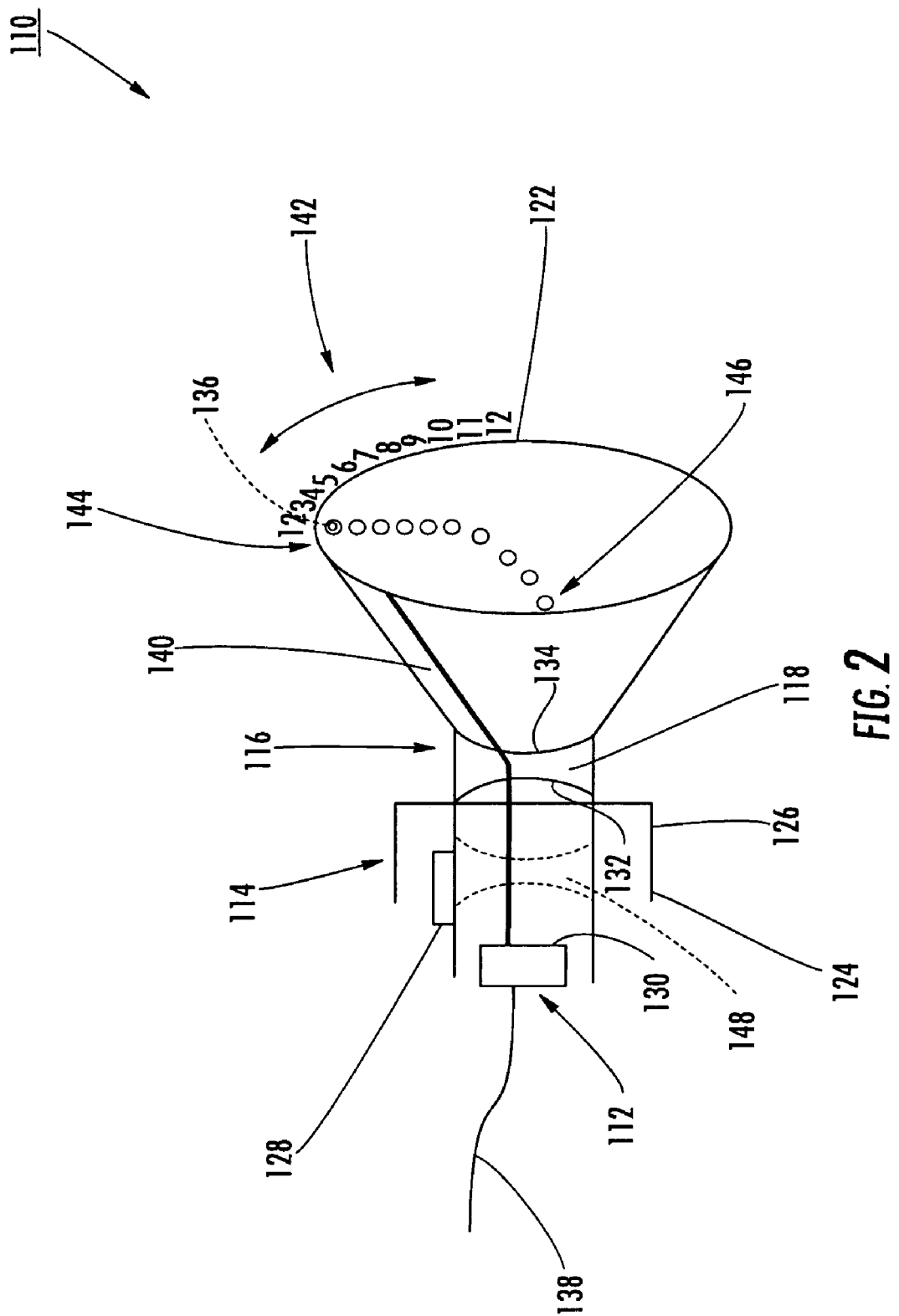
FIG. 2 is a schematic view of another embodiment of a polarity checking apparatus according to the present invention.

Turning now to FIG. 2, another polarity checking apparatus 110 having a body 124, a diverging lens 118, and a screen 112 is shown. In this example, the polarity checking apparatus 110 may be attached to a multi-fiber array connector ferrule 112 using body 124, which is similar to the body 24 described above. The body 124 may be attached to the multi-fiber array connector having ferrule 112 by utilizing any suitable configuration such as a press or snap-fit arrangement in addition to or as an alternative to coupling threads that engage the multi-fiber connector.

As shown in FIG. 2, a screen 122 is adjustable as represented by arrows in a direction 142. For instance, screen 122 is rotatable, and includes a top or illumination position 136 for selecting a particular optical fiber within ferrule 112. In other words, the screen 122 only allows for light 140 to pass when the correct optical fiber 138 (as above, only one optical fiber 138 is illustrated for clarity) is illuminated while the remainder of the screen 122 will not be illuminated. For example, if a $1^{st}$ optical fiber position 144 is rotated in a direction 142 to the illumination position 136 of the screen 122, light 140 from a optical fiber 138 will pass through a hole at the illumination position 136 only if that corresponding first optical fiber 138 is illuminated (i.e., emitting light). Similarly, if a 12$^{th}$ optical fiber position 146 in screen 122 is rotated to the illumination position 136, the light 140 will pass through the hole only if that corresponding 12$^{th}$ optical fiber (i.e., the optical fiber on other side on ferrule) is illuminated. Aside from the hole at the illumination position 136, the remaining portion of the screen 122 may be opaque such that the light 140 will pass only through the hole when the correct optical fiber 138 is illuminated based on the position of the screen 122 as described above.

The illumination position 136 need not be at the "top" of the screen 122 as shown in the example of FIG. 2. For instance, the illumination position 136 could be arranged elsewhere on the screen 122, such as on some other portion of a perimeter of the screen 122. Moreover, the screen 122 is not limited to rotation adjustment. For instance, the screen 122 may be adjusted using a lateral or translational movement; i.e., a left-right movement in lieu of, or in addition to, a rotary movement to obtain the desired alignment.

With final reference to FIG. 2, the divergent lens 118 may be incorporated within the dust cover 126 to protect the lens 118 (an alternatively positioned lens 148 is shown in phantom). This alternative arrangement makes the polarity checking tool 110 generally more rugged since the lens 148 is protected from dust and debris. The size, shape and position of the lenses 118, 148 are not to scale, and the necessary geometries and materials required to refract the light 140 in a desired direction may be modified according to particular field requirements. By way of example, lens 118 may be a double-concave, ground-glass lens approximately one inch in diameter, or the lens 118 may be two single concave lenses of different sizes mated together to change a focal point.

Figure 3:
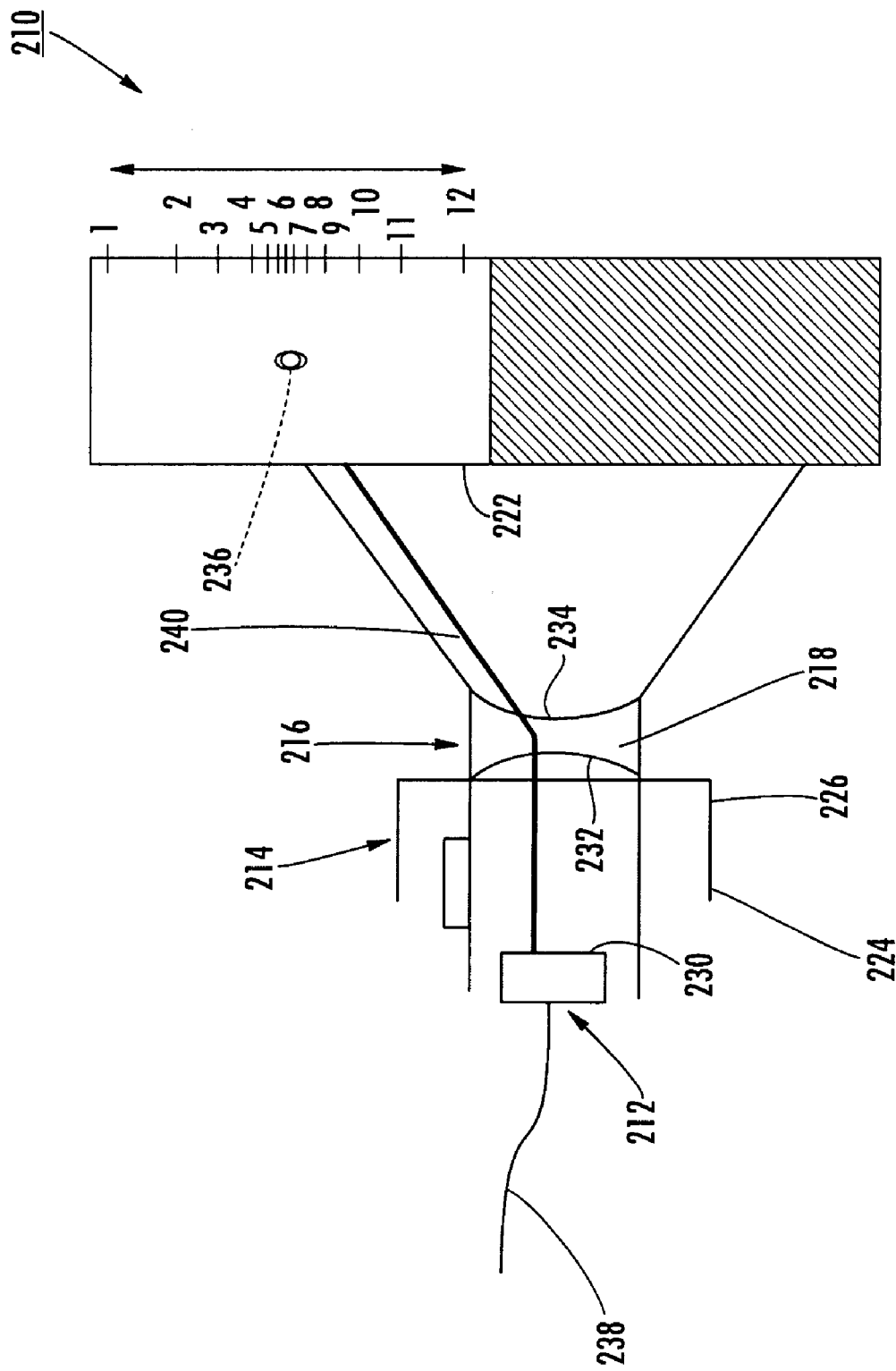
FIG. 3 is a schematic view of a further embodiment of a polarity checking apparatus according to the present invention.

Turning now to FIG. 3, a polarity checking apparatus 210, broadly includes a body 224 having a first portion 214 and a second portion 216 with a diverging lens 218, and a screen 222. As discussed previously, cover 226 may be removed from the assembly 224 to attach the first portion 214 to a hardened multi-fiber connector 212, or the cover 226 may have an elastomeric slit or other opening (not visible) that can be urged open to directly connect the first portion 214 to the connector 212 without having to remove the cover 226. Again, the body 224 may further include an interference portion that acts as a stop to ensure that potentially damaging contact with a ferrule end face 230 of the connector ferrule 212 is avoided when attached to the connector or ferrule.

As depicted, polarity checking apparatus 210 in FIG. 3 is attached to the assembly such as the connector having a multi-fiber ferrule 212 to check one or more optical fibers 238 (again only one optical fiber 238 is shown for clarity). In this example, the diverging lens 218 includes a first concave side 232 and a second concave side 234 by which a visual fault locator beam of light 240 from the optical fiber 238 passes through and exits toward a screen 222. Of course, other diverging lens configurations are also possible with the concepts of the invention such as a single-sided concave lens or the like. The diverging lens 218 bends the light 240 to diverge onto a target 236 of the translucent screen 222. In this example, the screen 222 may be a sliding ground-glass or plastic screen with the single target 236 that is moved to identify twelve different optical fiber positions. Specifically, a portion of the screen 222 or apparatus includes twelve notched positions labeled 1-12 that correspond to twelve of the optical fibers 238. Thus, the optical fiber position is identified by which position is selected for the single target 236 such as one of the optical fiber positions 1-12. The sliding screen 222 may be slid on a substantially vertical or y-axis as shown or the screen 222 may be configured to slide on other axes such as the x-axis (horizontally) depending on an exiting arrangement of the optical fibers 238.

The foregoing is a description of various embodiments of the disclosure that are provided here by way of example only. Although the polarity checking apparatus have been described with reference to the presently preferred embodiments and examples thereof, other embodiments and examples may perform similar functions and/or achieve similar results in the field. All such equivalent embodiments and examples are within the spirit and scope of the present disclosure and are intended to be covered by the appended claims and their equivalents. Moreover, although specific terms are employed herein, they are used in a generic and descriptive sense only and are not for purposes of limitation.

That which is claimed is:

1. A polarity checking apparatus for multi-fiber connectors, comprising:
    a body having a first portion and a second portion;
    a diverging lens attached to the first portion of the body; and
    a screen attached to the second portion of the body, wherein the apparatus determines polarity of a fiber optic connector that is mated to a first portion of the body by transmitting an optical signal from the fiber optic connector through the diverging lens and onto the screen.

2. The polarity checking apparatus of claim 1, wherein the body further includes a keyed portion for alignment with the fiber optic connector.

3. The polarity checking apparatus of claim 1, wherein the first portion of the body further is configured to avoid contact with a ferrule end face of the fiber optic connector.

4. The polarity checking apparatus of claim 1, wherein the screen is adjustable for checking optical fiber positions of the fiber optic connector.

5. The polarity checking apparatus of claim 1, wherein the screen includes at least one target for checking optical fiber positions of the multi-fiber connector.

6. The polarity checking apparatus of claim 1, wherein the screen includes an opaque portion.

7. The polarity checking apparatus of claim 1, wherein the screen includes an opaque portion and is rotatable for checking optical fiber positions of the fiber optic connector.

8. A polarity checking apparatus for multi-fiber connectors, comprising:
    a body, the body further including a mating portion for attaching to a portion of a multi-fiber connector, wherein the mating portion has a keyed portion for alignment with the multi-fiber connector;
    a diverging lens attached to the body; and
    a screen, the screen attached to the body, wherein the apparatus determines polarity of the multi-fiber connector.

9. The polarity checking apparatus of claim 8, wherein the screen is adjustable for checking optical fiber positions of the multi-fiber connector.

10. The polarity checking apparatus of claim 8, wherein the screen includes at least one target for checking optical fiber positions of the multi-fiber connector.

11. The polarity checking apparatus of claim 8, wherein the mating portion is configured to avoid contact with a ferrule end face of the multi-fiber connector.

12. The polarity checking apparatus of claim 8, wherein the screen includes an opaque portion.

13. The polarity checking apparatus of claim 8, wherein the screen is rotatable for checking optical fiber positions of the multi-fiber connector and includes an opaque portion.

14. A polarity checking apparatus for multi-fiber connectors, comprising:

a body having a first end, a medial portion and a second end;

a diverging lens attached to a medial portion the body; and a screen attached to a second end of the body and being adjustable for checking optical fiber positions of a multi-fiber connector, wherein the first end of the body can receive a multi-fiber connector for determining the polarity of the multi-fiber connector.

15. The polarity checking apparatus of claim 14, wherein the body further includes a mating portion for attaching to a portion of the multi-fiber connector.

16. The polarity checking apparatus of claim 14, wherein the body further includes a keyed portion, wherein the keyed portion is configured for alignment with the multi-fiber connector.

17. The polarity checking apparatus of claim 14, wherein the body further includes a mating portion for attaching to a portion of the multi-fiber connector, wherein the mating portion is configured to avoid contact with a ferrule end face of the multi-fiber connector.

18. The polarity checking apparatus of claim 14, wherein the screen further includes at least one target for checking optical fiber positions of the multi-fiber connector.

19. The polarity checking apparatus of claim 14, further comprising a cover for protecting the diverging lens.

20. The polarity checking apparatus of claim 14, wherein the screen includes an opaque portion.

21. A method for checking a polarity of a fiber optic assembly, comprising:

providing a polarity checking apparatus having a screen;

attaching the polarity checking apparatus to an assembly having a multi-fiber ferrule such that the polarity checking apparatus does not contact a ferrule end face of the multi-fiber array connector ferrule; and assessing a polarity of the multi-fiber array connector ferrule by checking for a light from a fiber of the multi-fiber array connector ferrule on the screen.

22. The method as in claim 21, wherein the screen includes at least one target for checking optical fiber positions of the multi-fiber array connector ferrule.

23. The method as in claim 21, further comprising adjusting the screen to check individual optical fiber positions of the assembly having the multi-fiber ferrule.

24. The method as in claim 21, wherein the screen includes a translucent portion and an opaque portion.

* * * * *